(12) United States Patent
Raggam (10) Patent No.: US 6,942,148 B2
(45) Date of Patent: Sep. 13, 2005

(54) COMMUNICATION DEVICE WITH A COIL CONFIGURATION FOR THE COMMUNICATION WITH STATIONARY DATA CARRIERS

(75) Inventor: Peter Raggam, St. Stefan im Rosental (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 403 days.

(21) Appl. No.: 10/135,349

(22) Filed: Apr. 30, 2002

(65) Prior Publication Data

US 2002/0177409 A1 Nov. 28, 2002

(30) Foreign Application Priority Data

May 4, 2001 (EP) .............................................. 01890129

(51) Int. Cl.[7] ................................................. G06K 7/08
(52) U.S. Cl. .................. 235/451; 340/272.1; 340/272.7
(58) Field of Search ......................... 340/572.7, 572.1, 340/572; 235/351, 451; 361/829, 831

(56) References Cited

U.S. PATENT DOCUMENTS

| | | | | |
|---|---|---|---|---|
| 4,135,183 A | * | 1/1979 | Heltemes ................. | 340/572.7 |
| 4,308,530 A | * | 12/1981 | Kip et al. ................ | 340/572.2 |
| 4,605,898 A | * | 8/1986 | Aittoniemi et al. ........ | 324/232 |
| 4,623,877 A | * | 11/1986 | Buckens ................... | 340/572.2 |
| 4,994,939 A | * | 2/1991 | Rubertus et al. ............ | 361/831 |
| 5,103,235 A | * | 4/1992 | Clemens ..................... | 343/742 |
| 5,349,502 A | * | 9/1994 | Westerberg et al. ........ | 361/829 |
| 5,440,296 A | * | 8/1995 | Nelson .................... | 340/572.7 |
| 6,219,530 B1 | | 4/2001 | Raggam ....................... | 455/41 |

FOREIGN PATENT DOCUMENTS

WO    WO 9633877    5/1996    ............ H01Q/7/04

* cited by examiner

Primary Examiner—Diane I. Lee
Assistant Examiner—Daniel A. Hess
(74) Attorney, Agent, or Firm—Kevin Simons (57) ABSTRACT

In a communication device (1) with firstly a coil configuration (2) which has two oppositely situated sub-configurations (3, 4), by means of which a communication field operative between the two sub-configurations (3, 4) can be generated and each of the two sub-configurations (3, 4) having at least two coils (5, 6, 7, 8), and with secondly sub-configuration signal-generating means (31) which are designed for the distinguishable generation and delivery of a first sub-configuration signal (TI1) and a second sub-configuration signal (TI2), for each of the two sub-configurations (3, 4), there are provided thirdly coil signal-generating means (32) which are designed for the distinguishable generation and delivery of coil signals (S1, S2, S3, S4) for the at least two coils (5, 6, 7, 8) of the respective sub-configuration (3, 4) on the basis of the respective sub-configuration signal (TI1, TI2).

20 Claims, 2 Drawing Sheets

COMMUNICATION DEVICE WITH A COIL CONFIGURATION FOR THE COMMUNICATION WITH STATIONARY DATA CARRIERS

The invention relates to a communication device for the communication with at least one data carrier which can be brought into a communication field of the communication device, and with a coil configuration which has two opposing sub-configurations by means of which the communication field operative between the two sub-configurations can be generated, and with sub-configuration signal-generating means which are designed for the distinguishable generation and delivery of a first sub-configuration signal and a second sub-configuration signal for a respective one of the two sub-configurations.

The invention furthermore relates to a coil configuration for the communication with at least one data carrier which can be brought into a communication field that can be generated with the coil configuration, the coil configuration having two opposing sub-configurations by means of which the communication field operative between the two sub-configurations can be generated.

A communication device of the generic type cited in the first paragraph of the introductory part with a coil configuration of the generic type cited in the second paragraph of the introductory part is known in connection with a transponder designed for contact-less communication which has been marketed under the designation I-CODE.

The known communication device is a so-called "scanning station" for the contactless and fully automatic registering of goods, packed in a plurality of packages having the shape of a rectangular solid and stacked on a pallet, in a channel-like communication area in which a conmunication field can be generated when in operation, each package being equipped with a transponder designed for contactless communication. Each transponder is equipped with a communication coil which spans a coil plane. The coil planes of the transponder communication coils connected to the packages situated on the pallet are oriented essentially parallel to an xy-plane or a yz-plane or an xz-plane, depending on how a package is positioned on the pallet.

The communication device has a coil configuration which is designed to form an inductive coupling with the communication coils of the transponders, so that the transponders can be supplied with power, thereby permitting contactless communication with the transponders. The coil configuration in this case has a first sub-configuration, which is formed by means of just a single first coil, and furthermore has a second sub-configuration which is formed by means of just a single second coil. The two coils are identical in shape, are formed flat and parallel to the yz-plane and are arranged at a distance from and congruently with one another, so that the channel-like communication area, in which the pallet can be placed, is formed essentially between the coils.

The communication device furthermore has sub-configuration signal-generating means which are designed for the reception of a high-frequency carrier signal and for breaking the carrier signal down into a first sub-configuration signal for the first sub-configuration and a second sub-configuration signal for the second sub-configuration. The sub-configuration signal-generating means are furthermore designed for generating a phase difference of 90 degrees between the two sub-configuration signals. A communication field which varies in time is thereby formed in the communication area.

With the known communication device there is the problem, that the communication field has a central area in which, depending on the orientation of the transponders, an unfavorable field distribution of the communication field prevails; this renders communication with a transponder, the communication coil of which has an unfavorable orientation of its coil plane parallel to the xy-plane or parallel to the xz-plane, virtually impossible, because a transponder with one of these orientations in this central area cannot be supplied with power and is therefore not capable of communication. For goods that are present in packages situated on a stationary pallet inside this central area there is, therefore, the problem that these goods cannot be registered fully automatically by a contactless method using the communication device, which entails a considerable additional work effort, such as repeated shifting of the pallet, for example, or a considerable structural cost, such as the provision, for example, of a displaceable coil configuration or the provision of a conveyor belt for moving the pallet.

The object of the invention is to overcome the aforementioned problems in a communication device conforming to the generic type cited in the first paragraph of the introductory part and in a coil configuration of the generic type cited in the second paragraph of the introductory part, and to create an improved communication device and an improved coil configuration.

In order to achieve the aforementioned object in a communication device according to the invention, features according to the invention are provided so that a communication device according to the invention may be characterized as follows:

a communication device for the communication with at least one data carrier which can be brought into a communication field of the communication device, and with a coil configuration which has two opposing sub-configurations, by means of which the communication field operative between the two sub-configurations can be generated, and with sub-configuration signal-generating means which are designed for the distinguishable generation and delivery of a first sub-configuration signal and a second sub-configuration signal for a respective one of the two sub-configurations, wherein each of the two sub-configurations has at least two coils and coil signal-generating means are provided which are designed for the distinguishable generation and delivery of coil signals for the at least two coils of the respective sub-configuration on the basis of the respective sub-configuration signal.

In order to achieve the aforementioned object in a coil configuration according to the invention, features according to the invention are provided so that a coil configuration according to the invention may be characterized as follow:

a coil configuration for the communication with at least one data carrier which can be brought into a communication field that can be generated with the coil configuration, wherein the coil configuration has two oppositely situated sub-configurations by means of which the communication field operative between the two sub-configurations can be generated, and each of the two sub-configurations has at least two coils.

Taxing the measures according to the invention advantageously ensures that a separate sub-communication area can be defined by each pair of coils that is formed by a coil of the first sub-configuration and by a coil of the second sub-configuration situated opposite the coil of the first sub-configuration. It has further proved advantageous that these sub-communication areas spatially overlap one another over the entire communication area, so that a reciprocal coverage of a sub-central range belonging to the respective subcommunication area is ensured. This affords the further decisive advantage that, within the communication field of the coil configuration, it is ensured that all data carriers present are reliably supplied with power and are therefore capable of communication, regardless of the respective orientation or the respective position. This affords the further advantage that goods which are equipped with data carriers can be registered fully automatically by a contactless method at any point within the communication area, and that no time-consuming and costly additional work effort or high structural cost are necessary for this purpose.

It has further proved advantageous in a communication device according to the invention if the features as claimed in claim 2 are additionally provided. This affords the advantage that unwanted reciprocal interference of the individual coils of each sub-configuration is avoided. This affords the further advantage that the individual coils of each sub-configuration can be used independently of one another. This affords the further advantage that the individual coils of each sub-configuration can be supplied with coil signals at no additional cost in terms of circuitry, it being possible for the coil signals to have any phase difference in relation to one another.

It has further proved advantageous in a communication device according to the invention if the features as claimed in claim 3 are additionally provided. This affords the advantage that the coils can be operated symmetrically in relation to a reference potential. This affords the further advantage that a voltage distribution symmetrical in relation to the coil central area is formed along the coil, so that capacitance currents between the coils of the respective sub-configuration can be largely avoided. This affords the further advantage that the coil halves formed as a result of the symmetrical operation of the coil act like a parallel connection of inductances, so that for the respective coil a total inductance is obtained, which amounts to only one quarter of the inductance value that prevails when a supply is fed to a coil end area. This affords the further advantage that in operation an increased coil current is present with a simultaneously reduced voltage between the coil terminals of a coil. This affords the further advantage that regulations relating to electromagnetic radiation applicable to the communication device are more easily complied with.

It has further proved advantageous in a communication device according to the invention if the features as claimed in claim 4 are additionally provided. This affords the advantage that the minimum of two coils in each sub-configuration can be installed compactly inside a panel. This affords the further advantage that precise and reliable positioning and orientation of the coils can be performed in the easiest possible manner. This affords the further advantage that the field distribution of the individual coils can be predefined with the greatest possible precision.

It has further proved advantageous in a communication device according to the invention if the features as claimed in claim 5 are additionally provided. This affords the advantage that the most advantageous symmetrical supply in respect of their coil currents is possible for corresponding coils. The further advantage is afforded that the field distribution in the communication area is as symmetrical as possible.

It has further proved advantageous in a communication device according to the invention if the features as claimed in claim 6 are additionally provided. This affords the advantage that whilst avoiding any unwanted magnetic intercoupling of the two coils, a relatively large flexibility is ensured in respect of the adaptability of an actual coil form to the physical conditions and requirements.

It has further proved advantageous in a communication device according to the invention if the features as claimed in claim 7 are additionally provided. This affords the advantage that an optimum far field obliteration is ensured, which is of great importance particularly with regard to meeting regulations.

It has further proved advantageous in a communication device according to the invention if the features as claimed in claim 8 are additionally provided. This affords the advantage that a magnetic decoupling of the minimum of two coils in each sub-configuration can be adapted to the respective conditions. This affords the further advantage that a reciprocal field coverage of the sub-central areas is fostered, because the sub-central areas of opposing pairs of coils are approximated to one another.

It has further proved advantageous in a communication device according to the invention if the features as claimed in claim 9 are additionally provided. This affords the advantage that the widest possible reciprocal field coverage of the sub-central areas is ensured, because a desired, amplified field displacement is achievable from the area between the first opposing pair of coils into the area between the second pair of opposing coils for approximately a first half cycle of the respective coil current, and because similarly a desired field displacement is achievable from the area between the first opposing pair of coils into the area between the second pair of opposing coils for a second half cycle. An extension of the respective sub-communication area of the opposing pairs of coils can thereby be achieved.

It has further proved advantageous in a communication device according to the invention if the features as claimed in claim 10 are additionally provided. This affords the advantage that a temporally successive, reciprocal field coverage of the sub-central areas recurring with the frequency of the coil signals is feasible.

It has further proved advantageous in a communication device according to the invention if the features as claimed in claim 11 are additionally provided. This affords the advantage that, for an instant during a cycle of the coil signal of a pair of coils within the sub-central range of this pair, exclusively the field of an adjacent pair is operative without interference.

It has further proved advantageous in a communication device according to the invention if the features as claimed in claim 12 are additionally provided. This affords the advantage that the period of reciprocal field coverage of the sub-central areas is freely selectable. This affords the further advantage that the communication area of the coil configuration is divisible into sub-communication areas for time periods of any length, which is of particular importance where there is a large number of data carriers within the communication area, when no deterministic anti-collision method is used in the communication, because then for a certain period of time it is intended that only one group of data carriers can be supplied with power. This affords the further advantage that in connection with data carriers of more modem generations, which may have essentially reduced physical dimensions, the maximum field strength is available for each sub-communication area, because during the respective time period only one single pair of opposing coils is supplied with the respective coil signal, so that the prevailing total signal output is available to the respective pair.

It has further proved advantageous in a communication device according to the invention if the features as claimed in claim 13 are additionally provided. This affords the advantage that receiving electronics can be provided which are of simpler design compared to conventional receiving means and can, therefore, be provided more cost-effectively, since the receiving means can be operated entirely independently of the coil configuration signal.

The invention will be further described with reference to three embodiments as shown in the drawings to which, however, the invention is not restricted.

Figure 1:
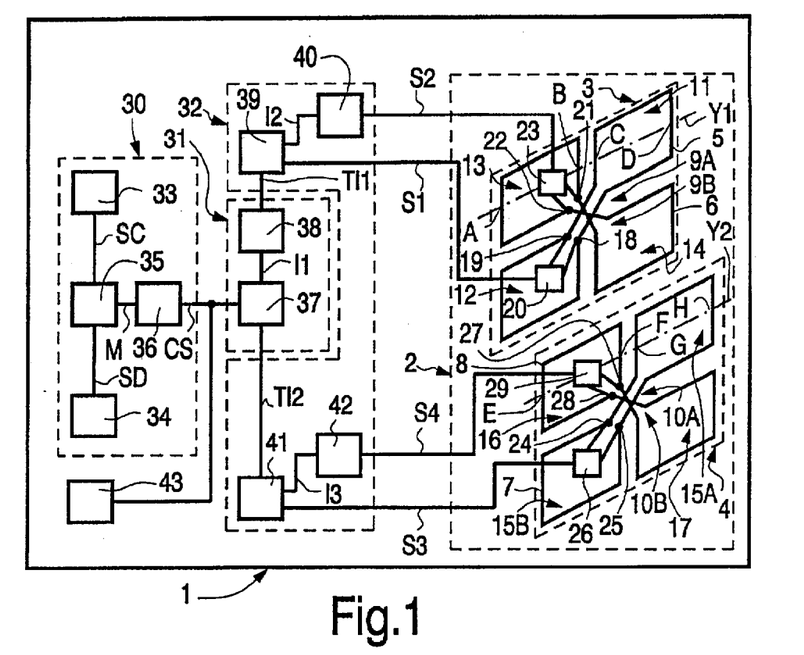
FIG. 1 shows a communication device according to a first embodiment of the invention diagrammatically in the form of a block diagram.

FIG. 1 represents a communication device 1, which is designed for communication with at least one data carrier that can be introduced into a communication field of the communication device. The communication device 1 forms a so-called "scanning-station". The data carriers are intended for the fully automatic registering of goods and are fitted to packages in which the goods are packed. The packages are arranged on a pallet. For the purpose of fully automatic registering of the goods, the pallet is deposited in a channel-like communication area and the data carriers remain stationary there during the communication. For the purpose of communication, the communication device 1 has a coil configuration 2, which has a first sub-configuration 3 and a second sub-configuration 4 situated opposite the first sub-configuration 3, by means of which two sub-configurations 3 and 4 the communication field operative between the two sub-configurations 3 and 4 can be generated. It should be mentioned at this point that the communication field does not operate exclusively between the two sub-configurations 3 and 4, as is clear to the person skilled in the art, but also in other areas, although in the present case it is primarily the area between the two sub-configurations 3 and 4 that is used for the communication.

The first sub-configuration 3 has a first coil 5 and a second coil 6. The second sub-configuration 4 has a third coil 7 and a fourth coil 8. The first coil 5 and the second coil 6 are, like the third coil 7 and the fourth coil 8, electromagnetically decoupled from one another. This ensures that the first coil 5 and the second coil 6 of the first sub-configuration 3 are uninfluenced by and independent of one another. This likewise applies to the third coil 7 and the fourth coil 8 of the second sub-configuration 4.

The first coil 5 has a first coil central area 9A. Starting from the first coil central area 9A, in which the conductors of the first coil 5 are arranged close together and parallel to one another, the conductors of the first coil 5 form a first coil area 11 and a second coil area 12, both the first coil area 11 and the second coil area 12 essentially having a rectangular shape. Accordingly, the first coil 5 essentially has a figure-of-eight shape with an uncrossed first coil central area 9A.

The second coil 6 has a second coil central area 9B. Starting from the second coil central area 9B, in which the conductors of the second coil 6 run close together and crossed, the conductors of the second coil 6 form a third coil area 13 and a fourth coil area 14, both the third coil area 13 and the fourth coil area 14 essentially having a rectangular shape. Accordingly, the second coil 6 essentially has a figure-of-eight shape with a crossed second coil central area 9B. In the first coil central area 9A the first coil 5 has a first coil terminal 18 and a second coil terminal 19. The first coil terminal 18 and the second coil terminal 19 are connected to first adaptation means 20. In the second coil central area 9B the second coil 6 has a third coil terminal 21 and a fourth coil terminal 22. Inside the first coil central area 9A the first coil terminal 18 and the second coil terminal 19 are arranged symmetrically between the first coil area 11 and the second coil area 12. In the second coil central area 9B the third coil terminal 21 and the fourth coil terminal 22 are arranged symmetrically between the third coil area 13 and the fourth coil area 14. The third coil terminal 21 and the fourth coil terminal 22 are connected to second adaptation means 23. The first coil 5 and the second coil 6 are coplanar with one another.

The third coil 7 has a third coil central area 10A. Starting from the third coil central area 10A, in which the conductors of the third coil 7 are arranged close together and parallel to one another, the conductors of the third coil 7 form a fifth coil area 15A and a sixth coil area 15B, both the fifth coil area 15A and the sixth coil area 15B essentially having a rectangular shape. Accordingly, the third coil 7 essentially has a figure-of-eight shape with an uncrossed third coil central area 10A.

The fourth coil 8 has a fourth coil central area 10B. Starting from the fourth coil central area 10B, in which the conductors of the fourth coil 8 run close together and crossed, the conductors of the fourth coil 8 form a seventh coil area 16 and an eighth coil area 17, both the seventh coil area 16 and the eighth coil area 17 essentially having a rectangular shape. Accordingly, the fourth coil 8 essentially has a figure-of-eight shape with a crossed fourth coil central area 10B. In the third coil central area 10A the third coil 7 has a fifth coil terminal 24 and a sixth coil terminal 25. The fifth coil terminal 24 and the sixth coil terminal 25 are connected to third adaptation means 26. In the fourth coil central area 10B the fourth coil 8 has a seventh coil terminal 27 and an eighth coil terminal 28. The seventh coil terminal 27 and the eighth coil terminal 28 are connected to fourth adaptation means 29. In the third coil central area 10A the fifth coil terminal 24 and the sixth coil terminal 25 are arranged symmetrically between the fifth coil area 15A and the sixth coil area 15B. In the fourth coil central area 10B the seventh coil terminal 27 and the eighth coil terminal 28 are arranged symmetrically between the seventh coil area 16 and the eighth coil area 17. The third coil 7 and the fourth coil 8 are coplanar with one another.

FIG. 1 shows a first line of intersection Y1 which is aligned parallel to the y-axis of a Cartesian system of co-ordinates and intersects the second coil 6 at a first point of intersection A and at a second point of intersection B, and intersects the first coil 5 at a third point of intersection C and at a fourth point of intersection D. FIG. 1 also shows a second line of intersection Y2 which is also aligned parallel to the y-axis and intersects the fourth coil 8 at a fifth point of intersection E and at a sixth point of intersection F, and intersects the third coil 7 at a seventh point of intersection G and at an eighth point of intersection H. The first sub-configuration 3 and its coils 5 and 6 and the second sub-configuration 4 and its coils 7 and 8 are arranged parallel to the yz-plane of the Cartesian system of co-ordinates. The first coil 5 of the first sub-configuration 3 is congruent with the opposing third coil 7 of the second sub-configuration 4. The first coil 5 and the third coil 7 form a first pair of opposing coils. The second coil 6 of the first sub-configuration 3 is congruent with the fourth coil 8 of the second sub-configuration 4. The third coil 7 and the fourth coil 8 form a second pair of opposing coils. The first sub-configuration 3 and the second sub-configuration 4 are, consequently, oriented parallel to and congruent with one another and arranged at a distance from one another, so that a channel-like communication area essentially of the shape of a rectangular solid is formed between the two sub-configurations 3 and 4. Each pair of the pairs formed from opposing coils generates a sub-communication field in its own right. As a function of the respective coil currents the communication field of the coil configuration 2 is formed as a superposition of the sub-communication fields. Accordingly, each pair of opposing coils generates a sub-communication area in its own right, the spatial extent and shape of which varies over time as a function of the coil currents.

The first adaptation means 20 is designed for the reception of a first coil signal S1 and for the generation of a coil current for the first coil 15 on the basis of the first coil signal S1. The second adaptation means 23 is designed for the reception of a second coil signal S2 and for the generation of a coil current for the second coil 6 on the basis of the second coil signal S2. The third adaptation means 26 is designed for the reception of a third coil signal S3 and for the generation of a third coil current for the third coil 7 on the basis of the third coil signal S3. The fourth adaptation means 29 is designed for the reception of a fourth coil signal S4 and for the generation of a fourth coil current for the fourth coil 8 on the basis of the fourth coil signal S4.

The four adaptation means 20, 23, 26 and 29 are each designed for connection to a so-called coaxial cable which has a wave impedance of 50 Ohm. The four adaptation means 20, 23, 26 and 29 are designed for adaptation of the wave impedance to the inductance of the respective coil 5, 6, 7 and 8, and essentially have a resonant circuit by means of which a coil current for the respective coil 5, 6, 7 and 8 can be generated on the basis of the respective coil signal S1, S2, S3 or S4. The four adaptation means 20, 23, 26 and 29 furthermore have a so-called "Balanced to Unbalanced Transformer (BALUTN)" which permits reception of the coil signals S1, S2, S3 or S4 with reference to a signal reference potential (not represented in FIG. 1) and operation of the coils 5, 6, 7 and 8 independently of this signal reference potential and symmetrically to a ground potential.

The communication device 1 has a signal source 30 and sub-configuration signal-generating means 31 and coil signal-generating means 32 for the purpose of generating the four coil signals S1, S2, S3 and S4, the coil signal-generating means 32 being connectable to the four adaptation means 20, 23, 26 and 29 by means of the coaxial cable.

The signal source 30 has carrier signal-generating means 33 which are designed for the generation and delivery of a high-frequency carrier signal SC. The signal source 30 furthermore has data-generating means 34 which are designed for the generation and delivery of scanning data SD for data carriers that are to be scanned. The signal source 30 furthermore has modulation means 35 which are designed for the reception of the carrier signals SC and the scanning data SD. The modulation means 35 are furthermore designed for the modulation of the carrier signals SC according to the scanning data SD and for the generation and delivery of a modulation signal M. The signal source 30 furthermore has amplification means 36. The amplification means 36 are designed for the reception of the modulation signal M and for the amplification of the power of the modulation signal M and for the delivery of the amplified modulation signal M as a configuration signal CS to the sub-configuration-generating means 31.

The sub-configuration signal-generating means 31 have a first signal splitting stage 37 and a first phase shift stage 38. The sub-configuration signal-generating means 31 are designed for the generation and the delivery of a first sub-configuration signal TI1 and of a second sub-configuration signal TI2 on the basis of the configuration signals CS. The first signal splitting stage 37 is designed for the reception of the configuration signal CS and for splitting the configuration signal CS into a first intermediate signal I1 and the second sub-configuration signal TI2, the first intermediate signal I1 and the second sub-configuration signal TI2 each having half of the power of the configuration signal CS. The first phase shift stage 38 is designed for the reception of the first intermediate signal I1. The first phase shift stage 38 is furthermore designed for shifting the phase of the first intermediate signal I1 by 120° in relation to the phase of the second sub-configuration signal TI2, so that the first phase shift stage 38 can deliver a first sub-configuration signal TI1 formed from the phase-shifted first intermediate signal I1, which first signal has a phase difference of 120° in relation to the second sub-configuration signal TI2.

The coil signal-generating means 32 are designed for the distinguishable generation and the delivery of coil signals S1 and S2, or S3 and S4, for the four coils 5, 6, 7 and 8 of the two sub-configurations 3 and 4 on the basis of the respective sub-configuration signal TI1 or TI2. For this purpose the coil signal-generating means 32 have a second signal splitting stage 39 and a second phase shift stage 40 and a third signal splitting stage 41 and a third phase shift stage 42.

The second signal splitting stage 39 is designed for the reception of the first sub-configuration signal TI1 and for the splitting of the first sub-configuration signal TI1 into a second intermediate signal I2 and the first coil signal S1, the second intermediate signal I2 and the first coil signal S1 each having half of the power of the first sub-configuration signal TI1. The second phase shift stage 40 is designed for the reception of the second intermediate signal I2 and for shifting the phase of the second intermediate signal I2 by 90° in relation to the first coil signal S1, so that the second phase shift stage 40 can output the second coil signal S2 formed from the phase-shifted second intermediate signal I2, which second coil signal has a phase difference of 90° in relation to the first coil signal S1. The third signal splitting stage 41 is designed for the reception of the second sub-configuration signal TI2 and for splitting the second sub-configuration signal TI2 into a third intermediate signal I3 and the third coil signal S3, the third intermediate signal I3 and the third coil signal S3 each having half of the power of the second sub-configuration signal TI2. The third phase shift stage 42 is designed for the reception of the third intermediate signal I3 and for shifting the phase of the third intermediate signal I3 by 90° in relation to the phase of the third coil signal S3, so that the third phase shift stage 42 can deliver the fourth coil signal S4 formed from the phase-shifted third intermediate signal I3, which fourth coil signal has a phase difference of 90° in relation to the third coil signal S3. Accordingly, the coil signal-generating means 32 are designed for the phase-differentiated generation of the coil signals S1 and S2 for the first coil 5 and the second coil 6 of the first sub-configuration 3. The coil signal-generating means 32 are furthermore designed for the phase-differentiated generation of the coil signals S3 and S4 for the third coil 7 and the fourth coil 8 of the second sub-configuration 4.

The communication device 1 furthermore has reception means 43 which, in the communication of the communication device 1 with a data carrier, are designed for the reception of a response signal from the data carrier. The reception means 43 are connected on the input side to the sub-configuration signal-generating means 31 and in the communication are designed for the detection and processing of a load modulation of the configuration signal CS generated by means of the data carrier.

The function the communication device 1 is explained in more detail below with reference to the field distribution represented in FIG. 4 and FIG. 5.

Figure 4:
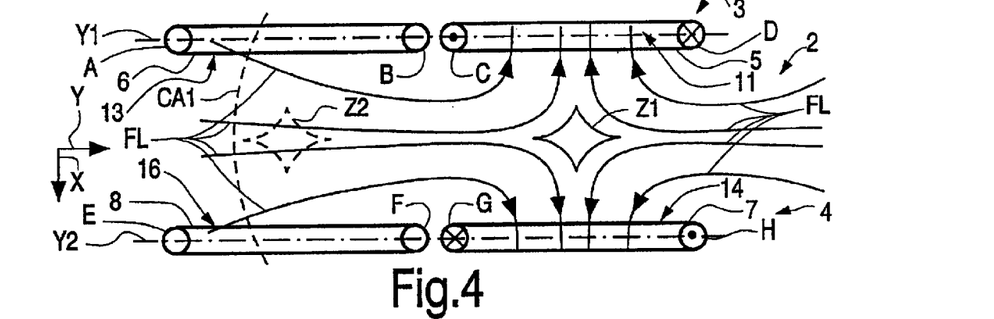
FIG. 4 shows, in diagrammatic form, a section through a coil configuration of the communication device according to a first embodiment of the invention and a field distribution of the coil configuration for a first instant.

FIG. 4 shows a first field distribution between the two sub-configurations 3 and 4 of the coil configuration 2 for a certain first instant and also a plane of section through the coil configuration 2 spanned by the parallel lines of intersection Y1 and Y2 and oriented parallel to the xy-plane. The first field distribution is typical of a first cyclically recurring instant for which the second coil 6 and the fourth coil 8 are currentless. At this first instant the field distribution inside the communication area of the coil configuration 2 is determined by the phase difference between the first coil signal S1 and the third coil signal S3. The field distribution thus produced is represented diagrammatically by means of field lines FL. Since for the instant represented the direction of the coil currents at the point of intersection C is oriented out of the plane of projection and at the point of intersection D into the plane of projection and at the point of intersection G into the plane of projection and at the point of intersection H out of the plane of projection, a field distribution is obtained in which a three-dimensional and virtually field-free first sub-central area Z1 is generated between the first coil 5 and the third coil 7. FIG. 4 shows a section through the first sub-central area Z1 inside the plane of intersection between the first coil area 11 of the first coil 5 and the fifth coil area 15A of the third coil 7. Owing to the symmetry of the first coil 5 in relation to the first coil central area 9A and owing to the symmetry of the third coil 7 in relation to the third coil central area 10A, the first sub-central area Z1 also exists between the second coil area 12 of the first coil 5 and the sixth coil area 15B of the third coil 7. At the first instant, however, the field lines FL pass through a second three-dimensional sub-central area Z2 which is located between the second coil 6 and the fourth coil 8 and of which a section inside the plane of intersection is represented in FIG. 4. The second sub-central area Z2, too, is not only located between the third coil area 13 of the second coil 6 and the seventh coil area 16 of the fourth coil 8 (as shown in the drawing in FIG. 4) but also between the fourth coil area 15A of the second coil 6 and the eighth coil area 17 of the fourth coil 8. The field strength generated by means of the first coil 5 and the third coil 7 in the second sub-central area Z2 is here selected so that, in relation to the first sub-central area Z1, a maximum first communication area CA1, within which communication must be feasible with a data carrier of any orientation, overlaps the second sub-central area Z2. It is important to understand in this context that the field lines FL within the second sub-central area Z2 do not run solely in the xy plane but pass through the plane of intersection. This ensures that a data carrier that can be brought inside the second sub-central area Z2 with its coil plane oriented parallel to the xy plane or parallel to the xz plane can be supplied with sufficient power to enable it to communicate.

Figure 5:
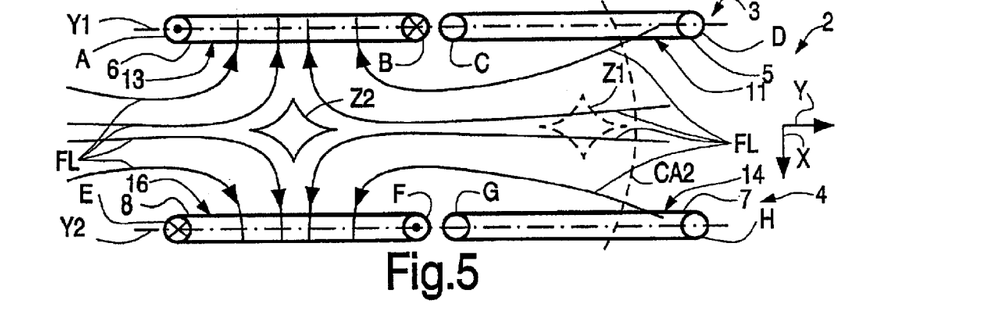
FIG. 5 shows, in diagrammatic form, a section through the coil configuration of the communication device according to the first embodiment of the invention and a field distribution of the coil configuration for a second instant.

In the same way as the field distribution represented in FIG. 4, FIG. 5 represents a second field distribution between the two sub-configurations 3 and 4 of the coil configuration 2. The second field distribution is typical of a second cyclically recurring instant for which the first coil 5 and the third coil 7 are currentless. At this second instant the direction of the coil currents at the point of intersection A is oriented out of the plane of projection and at the point of intersection B into the plane of projection and at the point of intersection E into the plane of projection and at the point of intersection F out of the plane of projection. At this second instant the field lines FL form the second sub-central area Z2 in which no communication with a data carrier is possible. At the second instant, however, the field lines FL pass through the first sub-central area Z1 between the first coil 5 and the third coil 7. The field strength in the first sub-central area Z1 generated by means of the second coil 6 and the fourth coil 8 is selected so that, in relation to the second sub-central area Z2, a maximum second communication area CA2, within which communication must be feasible with a data carrier of any orientation, overlaps the first sub-central area Z1. In this case, too, the field lines FL pass through the plane of intersection. This ensures that a data carrier that can be brought into the first sub-central area Z1 with its coil plane oriented parallel to the xy plane or parallel to the xz plane can be supplied with sufficient power to enable it to communicate.

Figure 2:
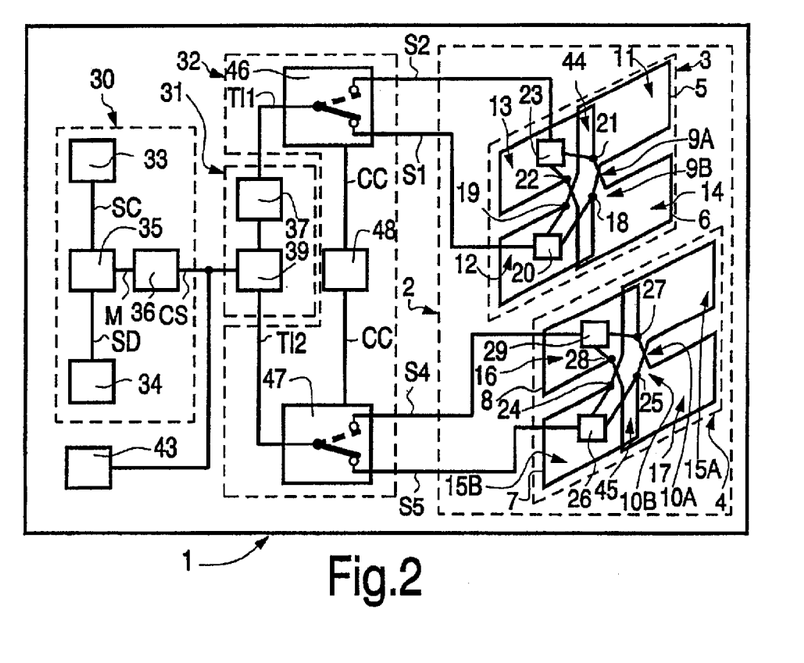
FIG. 2 shows a communication device according to a second embodiment of the invention diagrammatically in the form of a block diagram.

In the communication device 1 represented in FIG. 2 the conductors of the second coil 6 run inside the second coil central area 9B close together and uncrossed. Furthermore, the conductors of the fourth coil 8 run inside the fourth coil central area 10B close together and uncrossed. Accordingly, the second coil 6 essentially has a figure-of-eight shape with an uncrossed second coil central area 9B. Accordingly, the fourth coil 8 also has an essentially figure-of-eight shape with an uncrossed fourth coil central area 10B. The first coil 5 and the second coil 6 of the first sub-configuration 3, therefore, have an essentially identical design. In comparison to the coils 5, 6, 7 and 8 represented in FIG. 1, the two coils 5 and 6 of the first sub-configuration 3 and the two coils 7 and 8 of the second sub-configuration 4 have an identical orientation in respect of the Cartesian system of coordinates. Furthermore, the third coil 7 and the fourth coil 8 have an essentially identical design. Furthermore, the first coil 5 and the second coil 6 have a first overlap area 44. Accordingly, the first coil 5 and the second coil 6 are arranged so that their areas overlap one another along the y axis, so that the first coil area 11 and the third coil area 13, together with the fourth coil area 14 and the second coil area 12, have the first overlap area 44 in common. Like the first overlap area 44 of the first sub-configuration 3, the second sub-configuration 4 has a second overlap area 45 in which the third coil 7 and the fourth coil 8 are arranged with their areas overlapping along the y-axis, so that the fifth coil area 15A and the seventh coil area 16, together with the sixth coil area 15B and the eighth coil area 17, have the second overlap area 45 in common. This affords the advantage that the first sub-central area Z1 occurring during operation of the communication device 1 and the second sub-central area Z2 are moved closer to one another along the y-axis. It may be mentioned that the overlap can also be achieved along the z axis, so than moving the sub-central areas Z1 and Z2 closer together is feasible along the z axis. The two overlap areas along the y axis and the z axis may also be achieved simultaneously.

In the communication device 1 represented in FIG. 2 the coil signal-generating means 32 are designed for the time-differentiated generation of the coil signals S1 and S2 or S3 and S4 for the two coils 5 and 6 or 7 and 8 of the respective sub-configuration 3 or 4. For this purpose the coil signal-generating means 32 have first switching means 46 and second switching means 47 and switching control means 48. The first switching means 46 have a first switch condition and a second switch condition, the first switching means 46 being designed to relay in their first switch condition the first sub-configuration signal TI1 as first coil signal S1 to the first adaptation means 20, and the first switching means 46 being designed to relay in their second switch condition the first sub-configuration signal TI1 as second coil signal S2 to the second adaptation means 23. The second switching means 47 have a first switch condition and a second switch condition, the second switching means 47 being designed in their first switch condition to relay the second sub-configuration signal TI2 as third coil signal S3 to the third adaptation means 26, and the second switching means 46 being designed to relay in their second switch condition the second sub-configuration signal TI2 as fourth coil signal S4 to the fourth adaptation means 29. The first switching means 46 and the second switching means 47 are furthermore controllable in both of their switch conditions. The switching control means 48 are designed for the generation and the delivery of a control signal CC to the first switching means 46 and to the second switching means 47, making it possible for the first switching means 46 and the second switching means 47 to be switched synchronously with one another between their first switch condition and their second switch condition. This affords the advantage that, regardless of the period of the configuration signal CS, for any length of time either the first coil 5 is in operation simultaneously with the third coil 7 or the second coil 6 is in operation simultaneously with the fourth coil 8. This affords the advantage, that sub-communication fields can be generated entirely independently of one another. A further advantage is that any length of overlap of the sub-central areas is feasible.

Figure 3:
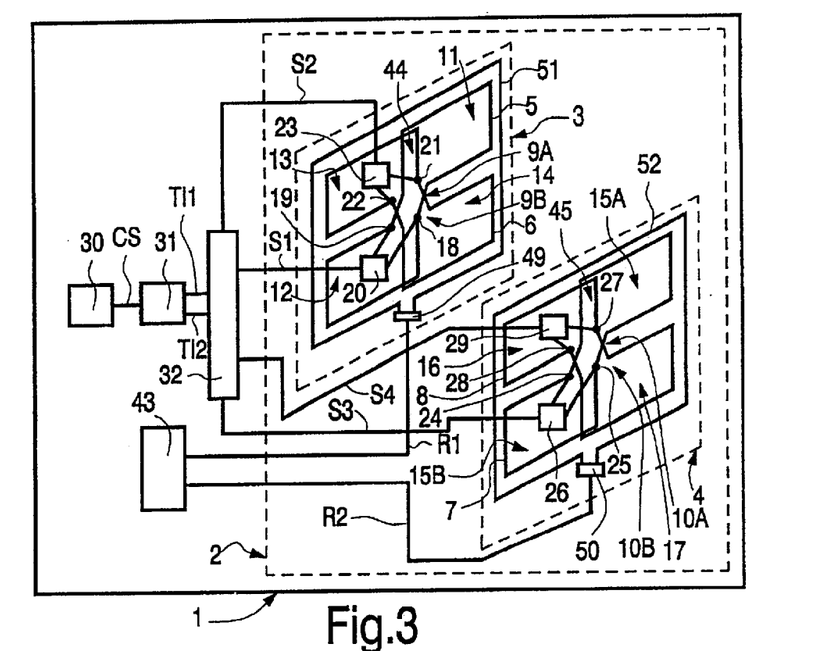
FIG. 3 shows a communication device according to a third embodiment of the invention diagrammatically in the form of a block diagram.

In the coil configuration 2 represented in FIG. 3 the first coil 5 and the second coil 6 and the third coil 7 and the fourth coil 8 have an orientation and design identical to the coils 5, 6, 7 and 8 represented in FIG. 2. The coil configuration 2, however, also has a first receiving coil 51 which is arranged separately in relation to the first coil 5 and the second coil 6 of the first sub-configuration 3. The coil configuration 2 furthermore also has a second receiving coil 52 which is arranged separately in relation to the third coil 7 and the fourth coil 8 of the second sub-configuration 4. The first receiving coil 51 is connected to the fifth adaptation means 49. The second receiving coil 52 is connected to the sixth adaptation means 50. The adaptation means 49 and 50 are essentially designed so that a coaxial cable having a wave impedance of 50 Ohm can be connected to the first receiving coil 51 and to the second receiving coil 52. The first receiving coil 51 is designed for the reception and delivery of a first response signal R1 in communication with a transponder. The second receiving coil 52 is designed for the reception and delivery of a second response signal R2 in communication with a transponder.

It may be mentioned that the two receiving coils 51 and 52 may essentially have a figure-of-eight shape each with a crossed receiving coil central area. Accordingly, the first receiving coil 51 may be designed so that, starting from their first receiving coil central area which is essentially congruent with the first coil central area 9A and the second coil central area 9B and in which the conductors of the first receiving coil 51 run close together and crossed, the conductors of the first receiving coil 51 form a first receiving coil area and a second receiving coil area, the first receiving coil area comprising the first coil area 11 and the third coil area 13 and the second receiving coil area comprising the second coil area 12 and the fourth coil area 14. Similarly, the second receiving coil 52 may be designed so that, starting from their second receiving coil central area which is essentially congruent with the third coil central area 10A and the fourth coil central area 10B and in which the conductors of the second receiving coil 52 run close together and crossed, the conductors of the second receiving coil 52 form a third receiving coil area and a fourth receiving coil area, the third receiving coil area comprising the fifth coil area 15A and the seventh coil area 16 and the fourth receiving coil area comprising the sixth coil area 15B and the eighth coil area 17. Like the four coils 5, 6, 7 and 8, the receiving coils may also have their receiving coil terminals inside the respective receiving coil central area symmetrically between the first receiving coil area and the second receiving coil area or symmetrically between the third receiving coil area and the fourth receiving coil area, to which receiving coil terminals the two receiving coils 51 and 52 are connected by the respective adaptation means 49 or 50. This affords the advantage that the first receiving coil 51 and the second receiving coil 52 are electrically decoupled from the four coils 5, 6, 7 and 8.

In the communication device 1 represented in FIG. 3 the reception means 43 can be connected directly to the fifth adaptation means 49 and to the sixth adaptation means 50 by means of coaxial cables and are designed for the reception and processing of the first response signal R1 and of the second response signal R2, the reception means 43 being capable of generating an aggregate response signal and delivering it for further processing. It may be mentioned that the aggregate response signal can be delivered from the communication device to a main computer. The provision of two receiving coils 51 and 52 and the direct processing of the response signals R1 and R2 affords the advantage that no expensive electronic equipment is needed for the reception means 43.

It may be mentioned that the coils 5, 6, 7 and 8 may also be essentially rectangular in shape with rounded corners, or of a round or oval shape.

It may be mentioned that the phase difference between the two sub-configuration signals TI1 and TI2 is variable within a range greater than 90° and less than 180° as a function of the desired degree of overlap of the sub-central areas Z1 and Z2.

It may be mentioned that the coil configuration 2 may also have more than two sub-configurations, and advantageously up to six sub-configurations. This affords the advantage that a sub-configuration can be arranged on each side of the communication area of the coil configuration 2 in the shape of a rectangular solid. It may be further mentioned in this context that the sub-configuration signal-generating means may be designed for the generation of more than two sub-configuration signals, that is, one sub-configuration signal for each sub-configuration. It may be further mentioned in this context that it is particularly advantageous if the coil configuration 2 has more than one pair of opposing sub-configurations, each of the pairs of opposing sub-configurations being oriented parallel to the yz plane and the pairs being arranged adjacent to one another, that is, one above the other in the direction of the z-axis. This is particular advantageous in cases where a pallet is deposited between the pairs of sub-configurations, on which pallet packages provided with data carriers are stacked, the overall dimension of which in the direction of the z axis is significantly longer than the dimension of the two base edge lengths of the pallet. Providing the pairs of opposing sub-configurations along the Z axis affords the advantage that an unnecessarily large interval between the sub-central areas of the pairs of opposing sub-configurations is effectively avoided.

It may be further mentioned that the individual sub-configurations may also have more than two coils. It may be mentioned in this context that the coil signal-generating means can also be designed for the generation of the corresponding number of coil signals, the coil signals being distinguishable in their phase or timing. It may be further mentioned that in the case of more than two coil signals for one sub-configuration, the coil signal-generating means can also be designed for the generation of group-identical coil signals for each sub-configuration.

What is claimed is:

1. A communication device (1) for the communication with at least one data carrier which can be brought into a communication field of the communication device, and with a coil configuration (2) which has two opposing sub-configurations (3, 4) by means of which the communication field operative between the two sub-configuration (3, 4) can be generated, and with sub-configuration signal-generating means (31) which are designed for the distinguishable generation and delivery of a first sub-configuration signal (TI1) and a second sub-configuration signal (TI2) for a respective one of the two sub-configurations (3, 4), wherein each of the two sub-configurations (3, 4) has at least two coils (5, 6, 7, 8) and coil signal-generating means (32) are provided which are designed for the distinguishable generation and delivery of coil signals (S1, S2, S3, S4) for the at least two coils (5, 6, 7, 8) of the respective sub-configuration (3, 4) on the basis of the respective sub-configuration signal (TI1, TI2), wherein each of the coils (5, 6, 7, 8) has two coil terminals (19, 18, 21, 22, 24, 25, 27, 28) and the two coil terminals (19, 18, 21, 22, 24, 25, 27, 28) of each coil (5, 6, 7, 8) are arranged in a coil central area (9A, 9B, 10A, 10B) and are connected to adaptation means (20, 23, 26, 29) and the coil signal-generating means (32) are designed for the delivery of the respective coil signal (S1, S2, S3, S4) to said adaptation means (20, 23, 26, 29) connected to a coil (5, 6, 7, 8), each said adaptation means being located in the same sub-configuration as the coil it drives, said generation means located external to either of said sub-configurations, and each said adaptation means designed for the reception of the respective coil signal from the generation means and sending of a corresponding current to the respective coil.

2. A communication device (1) as claimed in claim 1, wherein the at least two coils (5, 6, 7, 8) of each sub-configuration (3, 4) are electromagnetically decoupled from one another.

3. A communication device (1) as claimed in claim 2, wherein a first coil of the at least two coils (5, 6, 7, 8) essentially has a figure-of-eight shape with an uncrossed coil central area (9A, 10A) and a second coil of the at least two coils (5, 6, 7, 8) essentially has a figure-of-eight shape with a crossed coil central area (9B, 10B).

4. A communication device (1) as claimed in claim 2, wherein the at least two coils (5, 6, 7, 8) essentially have a figure-of-eight shape with an uncrossed coil central area (9A, 9B, 10A, 10B).

5. A communication device (1) as claimed in claim 4, wherein the at least two coils (5, 6, 7, 8) are arranged with areas overlapping one another.

6. A communication device (1) as claimed in claim 4, wherein reception means (43) are provided which, in the communication of the communication device (1) with a data carrier, are designed for the reception of a response signal from the data carrier, and the coil configuration (2) has at least one receiving coil (51, 52) arranged separately in relation to the at least tow coils (5, 6, 7, 8) of each sub-configuration (3, 4), which receiving coil serves during communication for the reception and delivery of the response signal (R1, R2), and the reception means (43) are connected to the at least one receiving coil (51, 52) and are designed for the reception and processing oft he response signal (R1, R2).

7. A communication device (1) as claimed in claim 1, wherein the at least two coils (5, 6, 7, 8) of each sub-configuration (3, 4) are coplanar with one another.

8. A communication device (1) as claimed in claim 1, wherein each coil (5, 6) of the first sub-configuration (3) is congruent with an oppositely situated coil (7, 8) of the second sub-configuration (4).

9. A communication device (1) as claimed in claim 1, wherein the sub-configuration signals (TI1, TI2) have different phase positions and the phase difference between the sub-configuration signals (TI1, TI2) lies in a range between 90 degrees and 180 degrees.

10. A communication device (1) as claimed in claim 1, wherein the coil signal-generating means (32) are designed for the phase-differentiated generation of the coil signals (S1, S2, S3, S4) for the at least two coils (5, 6, 7, 8) for the respective sub-configuration (3, 4).

11. A communication device (1) as claimed in claim 10, wherein the phase difference between the coil signals is 90 degrees.

12. A communication device (1) as claimed in claim 1, wherein the coil signal-generating means (32) are designed for the time-differentiated generation of the coil signals (S1, S2, S3, S4) for the at least two coils (5, 6, 7, 8) of the respective sub-configuration (3, 4).

13. A coil configuration (2) for the communication with at least one data carrier which can be brought into a communication field that can be generated with the coil configuration (2), wherein the coil configuration (2) has two oppositely situated sub-configurations (3, 4) by means of which the communication field operative between the two sub-configurations (3, 4) can be generated, and each of the two sub-configurations (3, 4) has at least two coils (5, 6, 7, 8) and coil signal-generating means (32) are provided which are designed for the distinguishable generation and delivery of coil signals (S1, S2, S3, S4) for the at least two coils (5, 6, 7, 8) of the respective sub-configuration (3, 4) on the basis of a respective sub-configuration signal (TI1, TI2), wherein each of the coils (5, 6, 7, 8) has two coil terminals (19, 18, 21, 22, 24, 25, 27, 28) and the two coil terminals (19, 18, 21, 22, 24, 25, 27, 28) of each coil (5, 6, 7, 8) are arranged in a coil central area (9A, 9B, 10A, 10B) and are connected to adaptation means (20, 23, 26, 29) and the coil signal-generating means (32) are designed for the delivery of the respective coil signal (S1, S2, S3, S4) to said adaptation means (20, 23, 26, 29) connected to a coil (5, 6, 7, 8), each said adaptation means being located in the same sub-configuration as the coil it drives, said generation means located external to either of said sub-configurations, and each said adaptation means designed for the reception of the respective coil signals from the generation means and sending of a corresponding current to the respective coil.

14. A coil configuration (2) as claimed in claim 13, wherein the at least two coils (5, 6, 7, 8) of each sub-configuration (3, 4) are electromagnetically decoupled from one another.

15. A communication device (2) as claimed in claim 14, wherein each coil (5, 6) of the first sub-configuration (3) is congruent with an oppositely situated coil (7, 8) of the second sub-configuration (4).

16. A communication device (2) as claimed in claim 14, wherein a first coil of the at least two coils (5, 6, 7, 8) essentially has a figure-of-eight shape with an uncrossed coil central area (9A) and a second coil of the at least two coils (5, 6, 7, 8) essentially has a figure-of-eight eight shape with a crossed coil central area (9B, 10B).

17. A communication device (2) as claimed in claim 14, wherein the at least two coils (5, 6, 7, 8) essentially have a figure-of-eight shape with an uncrossed coil central area (9A, 9B, 10A, 10B).

18. A communication device (2) as claimed in claim 17, wherein the at least two coils (5, 6, 7, 8) are arranged with areas overlapping one another.

19. A communication device (2) as claimed in claim 17, wherein the coil configuration (2) has at least one receiving coil (51, 52) arranged separately in relation to the at least two coils (5, 6, 7, 8) of each sub-configuration (3, 4).

20. A coil configuration (2) as claimed in claim 13, wherein the at least two coils (5, 6, 7, 8) of each sub-configuration (3, 4) are coplanar with one another.

* * * * *